United States Patent [19]

Zahid

[11] 4,299,254

[45] Nov. 10, 1981

[54] PRESSURE ACCUMULATOR HAVING A LONG LIFE DISTENSIBLE BLADDER

[75] Inventor: Abduz Zahid, Los Angeles, Calif.

[73] Assignee: Greer Hydraulics, Incorporated, Chatsworth, Calif.

[21] Appl. No.: 113,490

[22] Filed: Jan. 21, 1980

[51] Int. Cl.³ .................... F16L 55/02; F16L 55/04

[52] U.S. Cl. .................................... 138/30

[58] Field of Search ............................ 138/30

[56] References Cited

U.S. PATENT DOCUMENTS 3,442,292 5/1969 Jacuzzi .................... 138/30
3,868,972 3/1975 Zirps .................... 138/30
4,084,621 4/1978 Sugimura et al. .................... 138/30
4,117,866 10/1978 Bohm et al. .................... 138/30
4,143,678 3/1979 Sugimura et al. .................... 138/30

FOREIGN PATENT DOCUMENTS 2409736 9/1975 Fed. Rep. of Germany ........ 138/30
1337549 11/1973 United Kingdom ................ 138/30

*Primary Examiner*—John W. Shepperd
*Attorney, Agent, or Firm*—Arthur B. Colvin

[57] ABSTRACT

The present invention is directed to a hydraulic accumulator device which may be built at low cost and which includes an elastomeric bladder member and a button or valve component adapted to seat on the oil port when pressures in the gas chamber exceed the pressure in the hydraulic line and to unseat when the pressure conditions are reversed. The device includes a button carried by the bladder positioned to seat on the oil port and is characterized by the button, bladder, and oil port having certain critical dimensional inter-relationships which greatly reduce the possibility of damage to the bladder and consequent failure of the accumulator.

1 Claim, 1 Drawing Figure

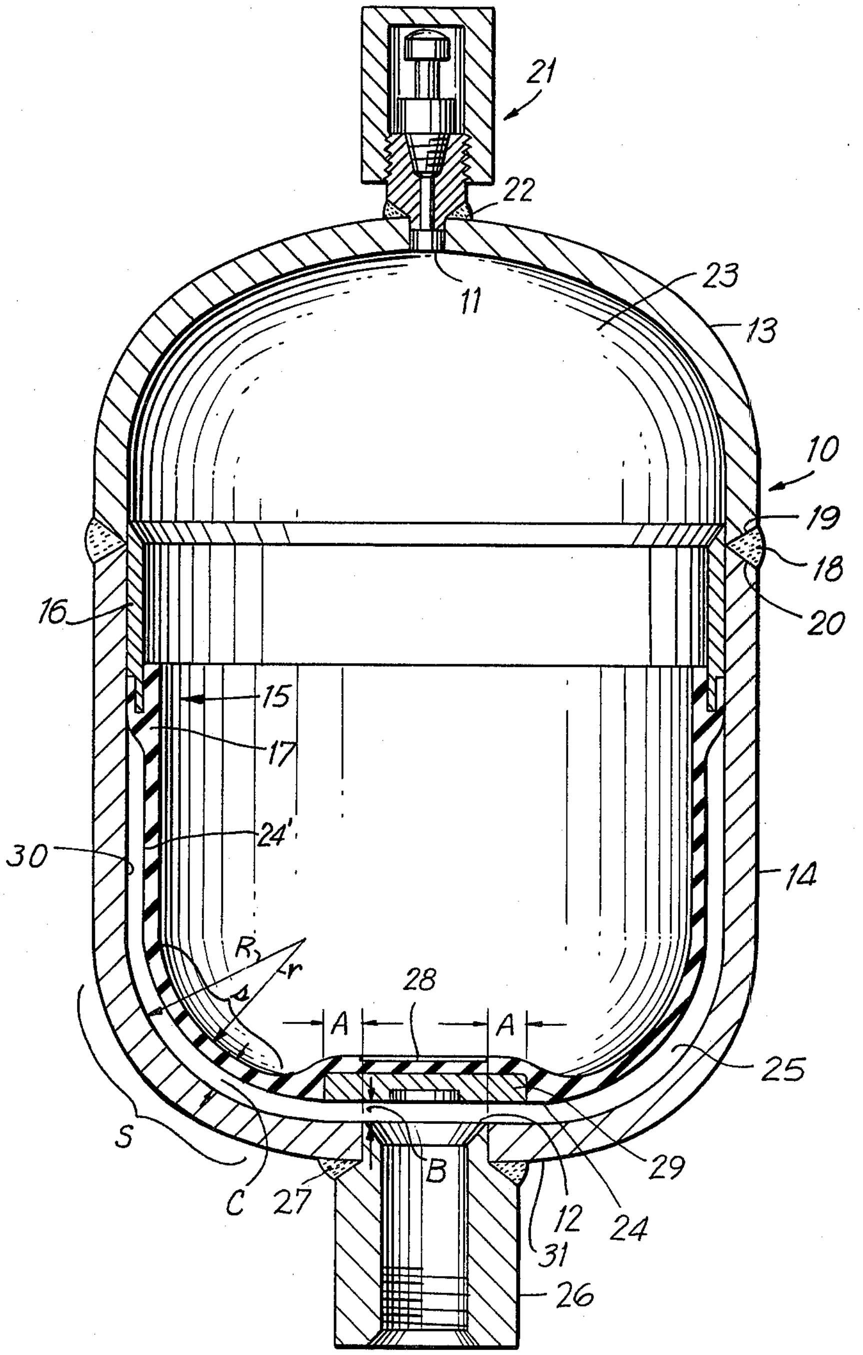
21
22
23
11
13
10
19
18
20
16
15
17
24'
30
14
R
r
28
A
A
25
S
B
29
C
27
12
24
31
26

PRESSURE ACCUMULATOR HAVING A LONG LIFE DISTENSIBLE BLADDER

BACKGROUND OF THE INVENTION

1. Field of the Invention

The present invention is in the field of hydraulic accumulator devices and is directed more particularly to a hydraulic accumulator of the type which includes a pressure vessel having a gas charging port at one end and an oil port at the other, the vessel being divided into two chambers of varying sizes by a distensible elastomeric bladder.

2. The Prior Art

The use of hydraulic accumulators including rigid pressure vessels incorporating, as noted, a distensible bladder member to divide the interior into two chambers, is a well known expedient for purposes of energy storage and pulse dampening. Devices of the type described frequently incorporate, in addition, a rigid valve or button member mounted on the bladder and juxtaposed to the oil port, such rigid member functioning to seat against the oil port when pressures in the gas chamber exceed those in the hydraulic fluid communicated to the oil port. By thus providing a valve member, the possibility of extruding the bladder through the oil port is minimized.

Heretofore devices, whether or not utilizing the button type anti-extrusion assembly, have been short lived. Compromise of the bladder components of such devices have often resulted where the bladder expands rapidly, resulting in portions of the bladder other than the button or like expedients being engaged against and passing through the oil port.

Various means have been effectively employed to increase the life of the bladder components in the devices of the type described. Such expedients include the provision of poppet valves seated within the oil port, physical connection of the bladder to a guiding mechanism which assures that only selected portions of the bladder will be engaged against the oil port, and the like. It will, however, be readily recognized that the provision of poppets, guide mechanisms and the like greatly increases the complexity and, hence, the cost of accumulators.

In an effort to maintain the cost of accumulators at a desired low level, attempts have been made carefully to control the wall thickness of all portions of the bladder assembly with the expectation that by so doing a uniform and predictable expansion of the bladder may be achieved notwithstanding rapid pressure fluctuations. It was hoped that by achieving a uniform expansion of the bladder, movements of the button would be predictable, with concomitant effective seating of the button against the oil port whereby bladder damage could be avoided.

Such attempted mode of solution of the problem has been unsuccessful since precise controlling of the bladder thickness itself adds a substantial degree of cost to the manufacture of the bladder. Further, it has been found that after many operative cycles the stretch characteristics of the bladder change, recreating the problem of uneven expansion, misdirection of the button and consequent destruction of the bladder.

SUMMARY OF THE INVENTION

The present invention may be summarized as directed to a low cost accumulator device comprising a pressure vessel or shell having an oil port at one end adapted to be connected to a hydraulic system, and a gas charging port at the other end within which a gas charging valve may be mounted.

The bladder member is interposed between the ports, dividing the interior of the vessel or shell into two chambers communicated, respectively, with the oil port and the gas port. The bladder is provided with a button or stop plate of rigid material.

The device is characterized by correlating the dimensions and positions of the bladder and the oil port such that the spacing in an axial direction of the button from the port (hereinafter spacing B) should be less than a distance A, being the extent by which the radius of the button exceeds the radius of the oil port.

The device is further characterized by the conformation of the pressure vessel surrounding the oil port and the conformation of the lowermost end of the unstressed bladder adjacent the lowermost portion of the pressure vessel, both being parti-spherical and the difference in radii C of the said parti-spherical portions being less than the said distance A. Preferably, in addition, no portion of the unstressed bladder is spaced from the juxtaposed portion of the shell by a distance C which is greater than distance A.

When the noted critical dimensional characteristics are incorporated in a hydraulic accumulator device, the life of the bladder is greatly extended and instances of bladder failure substantially reduced without the necessity for employing poppet valves, bladder guides and like high expense expedients.

Accordingly, it is an object of the invention to provide a low cost accumulator device for use in energy storage or pulsation dampener applications.

It is a further object of the invention to provide a device of the type described wherein instances of bladder failure are minimized without the use of poppet valves or guides by critically dimensioning the spacing of the button or rigid plate member carried by the bladder relative to the diameter of the oil port in such manner that the axial spacing of the button from the port is less than the amount by which the radius of the button exceeds the radius of the port.

It is a further object of the invention to provide a device of the type described wherein the interior surface of the pressure vessel surrounding the oil port is partispherical, as is the juxtaposed proximal surface of the unstressed bladder, the difference in length of the radii of curvature of the respective parti-spherical components being less than the distance A by which the radius of the button exceeds the radius of the oil port.

A further object of the invention is the provision of a device of the type described and further characterized in that no portion of the unstessed bladder is spaced from the nearest adjacent wall surface of the pressure vessel by a distance C which is greater than the distance A.

To attain these objects and such further objects as may appear herein or be hereinafter pointed out, reference is made to the accompanying drawing wherein the FIGURE comprises a vertical section through an accumulator in accordance with the invention.

Turning to the drawing, there is shown an accumulator device in accordance with the invention, the device including generally a pressure vessel 10 having a gas charging port 11 and an oil port 12. The pressure vessel 10 may be comprised of an upper shell half 13 and a lower shell half 14.

A bladder assembly 15 comprises a metallic retainer ring 16 bonded to, molded over, or otherwise permanently secured to a thickened rim portion 17 at the upper or open mouth portion of the bladder. The retainer ring 16, prior to assembly of the pressure vessel components 13, 14 or simultaneously therewith, is connected to the interior wall surface of the pressure vessel, as by welding (not shown).

After affixation of the ring 16, the shell halves 13, 14 may be permanently interconnected as by an annual weld 18 disposed between beveled annular edge portions 19, 20 of the shell halves 13, 14, respectively.

A gas charging valve assembly 21, conventional in nature, is mounted in the gas charging port 11 as by an annular weld 22, the gas charging valve assembly providing means for introducing gas under pressure into the gas chamber 23 defined between the upwardly facing surface of the bladder 24 and the interior of the pressure vessel.

An oil chamber 25 is defined between the downwardly facing surface of the bladder 24 and the oil port 12.

A nipple 26 is weldingly connected as at 27 to the lower portion 31 of the pressure vessel surrounding the oil port 12, said nipple 26 providing a means for connecting the oil chamber 25 to the hydraulic line of a hydraulic assembly and mechanically supporting the accumulator in a desired position.

The lower shell half 14 includes a segment S which is a section or segment of a sphere and is thus referred to as parti-spherical.

The juxtaposed portion of the unstressed bladder 24 likewise includes a segment s which is parti-spherical. The radius of curvature R of the segment S exceeds the radius of curvature r of segment s by a distance C in the unstressed condition of the bladder.

The bladder, at its lower central portion 28, includes a button or valve member 29 which is generally disk-shaped. The radius of the disk-shaped button 29 exceeds the radius of the oil port 12 by a distance A which is greater than the distance B, said distance B being the distance, in the axial direction, by which the button is spaced from the oil port.

Preferably, in addition, all portions of the outer wall surface 24' of the bladder 24 are spaced from all portions of the inner surface 30 of the lower shell section 14 a distance less than the distance A as above defined.

The operation of the accumulator device is essentially conventional except that there is virtually no tendency for damage to the bladder member. More particularly, the nipple 26 is connected to the liquid conduit of a hydraulic system and the interior of the chamber 23 is charged with gas under pressure through the gas charging valve assembly 21. When the pressure within the chamber 23 exceeds the pressure within the hydraulic system, gas within the chamber will cause the bladder to expand and line the interior of the pressure vessel, and will cause the button 29 to seat on the oil charging port.

When pressure within the conduit to which the nipple 26 is connected exceeds the pressure within the chamber 23, the button 29 will be unseated from the oil port and liquid will be permitted to flow into the chamber 25. The bladder will be displaced upwardly toward the gas charging end of the chamber to a degree dependent upon the extent by which the liquid pressure exceeds the gas pressure, until a condition is reached in which the pressures in the respective chambers equalize. When the pressure again drops in the liquid conduit (an action which may occur suddenly or in a relatively gradual fashion) to a point at which the pressure in the chamber 23 exceeds the pressure in the conduit, gas pressure will cause the button to reseat over the oil port, the rigid button preventing extrusion of the bladder through the oil port.

Where the critical dimensions hereinabove set forth are present, the button member will invariably be properly seated over the oil port and function in the desired manner to prevent extrusion. This effective seating action is virtually independent of irregularities in the thickness of the bladder. Likewise, the dependable seating action noted is effective whether or not the pressure fluctuations are sudden or gradual and progressive.

While the benefits of the invention may, in a measure, be achieved by providing an accumulator construction in which the distance A exceeds the distance B, the most dependable operation is achieved where all of the noted dimensional conditions are observed, i.e. where, in addition, the differences between radii R and r are less than distance A and the distance A exceeds the distance C.

Having thus described the invention and illustrated its use, what is claimed as new and is desired to be secured by Letters Patent is:

1. A hydraulic accumulator device of the type comprising a pressure vessel having an interior surface defining an interior space which is cylindrical in section and has generally hemispherical end portions, one of said end portions including a gas charging port, the other of said end portions including a circular oil port whose center is aligned with the longitudinal axis of said vessel, the interior surface of said vessel, surrounding said oil port, being generally planar, a bladder of resilient distensible material received within said vessel, said bladder being cylindrical in section and coaxially oriented with respect to said vessel, said bladder including a first end portion secured to said vessel interior surface and disposed toward said gas charging port, and a second closed generally hemispherical end directed toward said oil port, said second closed end being in spaced conformance to the interior surface of vessel and including a central generally planar outer surface in spaced overlying relation to the generally planar interior surface surrounding said oil port, said bladder, throughout the full extent thereof inward of said first end and in its unstressed position, including a smooth outer wall surface in inwardly spaced relation to the interior surface of the vessel and defining a space between the bladder and said interior surface, said central generally planar outer surface of said second closed end comprising a portion of said smooth outer wall surface, said bladder dividing the interior of said vessel into two chambers in communication, respectively, with said oil and said gas ports, said bladder including a rigid valve member generally in the form of a disk in the planar outer surface of said closed end, said valve member being circular in section and having a generally planar outer surface generally coplanar with the planar outer surface of said closed end of the bladder, said valve member being coaxially disposed with respect to said longitudinal axis, said valve member including a peripheral edge which, in the unstressed position of said bladder, extends beyond an upward projection of said oil port, at every point thereabout, by a distance A greater than the spacing B of the planar outer surface of the valve member closest to said oil port, measured in the direction of the axis of said vessel from said oil port, and by a distance C greater than said space between the bladder and the interior surface of the vessel.

* * * * *